United States Patent [19]

Foschini

[11] Patent Number: 4,800,555

[45] Date of Patent: Jan. 24, 1989

[54] TECHNIQUE FOR REPELLING CARRIERS IN OPTICAL COMMUNICATIONS TO MINIMIZE MUTUAL INTERFERENCE

[75] Inventor: Gerard J. Foschini, Sayreville, N.J.

[73] Assignee: American Telephone and Telegraph Company, AT&T Bell Laboratories, Murray Hill, N.J.

[21] Appl. No.: 34,135

[22] Filed: Mar. 3, 1987

[51] Int. Cl.$^4$ .............................................. H04B 9/00
[52] U.S. Cl. ........................................ 370/3; 455/607; 455/617
[58] Field of Search ............... 455/601, 606, 607, 608, 455/609, 612; 370/3

[56] References Cited

U.S. PATENT DOCUMENTS

| | | | |
|---|---|---|---|
| 3,983,484 | 9/1976 | Hodama | 325/20 |
| 4,186,343 | 1/1980 | Kakigi | 325/17 |
| 4,225,851 | 9/1980 | Reschovsky et al. | 340/177 |
| 4,232,385 | 11/1980 | Hara et al. | 370/3 |
| 4,438,405 | 3/1984 | Yazawa et al. | 328/152 |
| 4,579,417 | 4/1986 | Ih | 455/609 |
| 4,601,027 | 7/1986 | Scarr et al. | 370/3 |
| 4,680,810 | 7/1987 | Swartz | 455/618 |
| 4,691,385 | 9/1987 | Tupman | 455/607 |

OTHER PUBLICATIONS

Kinsel, Proc. IEEE, vol. 58, No. 10, Oct. 1970, pp. 1666–1682.
Delange, Proc. IEEE, vol. 58, No. 10, Oct. 1970, pp. 1683–1690.
Smith et al., ICC '78, Toronto, Canada, vol. 1, pp. 7.5.1–7.5.5.
Correa et al., NTC '80, Houston, Tex., vol. 1, pp. 3.6.1–3.6.6.
Krumpholz et al., Electronic Engr., vol. 57, No. 700, Apr. 1985, pp. 53–56.

Primary Examiner—Robert L. Griffin
Assistant Examiner—Leslie Van Beek
Attorney, Agent, or Firm—Erwin W. Pfeifle

[57] ABSTRACT

The present invention relates to a technique for repelling carriers in a Frequency Division Multiplexed (FDM) lightwave communication system to minimize mutual interference between signals. The system comprises a plurality of transceivers (20), each comprising a transmitter section (30) and a receiver section (40) which is coupled to a separate user of the system on one side, and on the other side to a lightwave communication arrangement (21–23) that interconnects the plurality of transceivers. Each of the transmitter sections of the system uses a separate carrier (10–14) for transmitting an associated users' information signal, and, during each sequential test cycle period, slowly dithers this carrier in random order to a first nearby frequency (50), on one side of the nominal carrier frequency, and then to a second nearby frequency (51) on the other side of the nominal carrier frequency. Each receiver section monitors and measures the background interference at each of the first and second nearby side frequencies of the desired channel and sends a control signal back to the associated transmitter section to move the frequency of its carrier to the nearby side frequency indicating the least noise for the next testing cycle where the above technique is repeated.

3 Claims, 4 Drawing Sheets

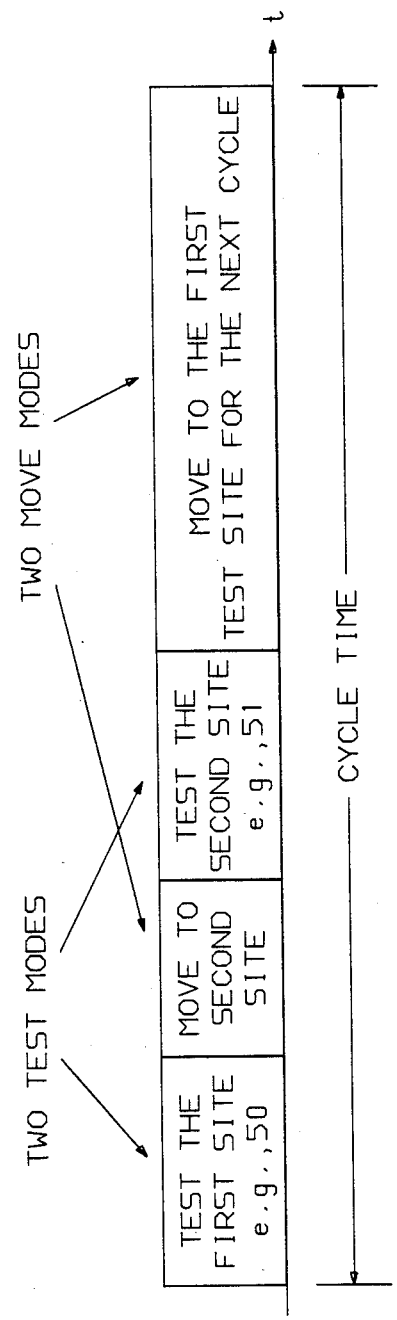

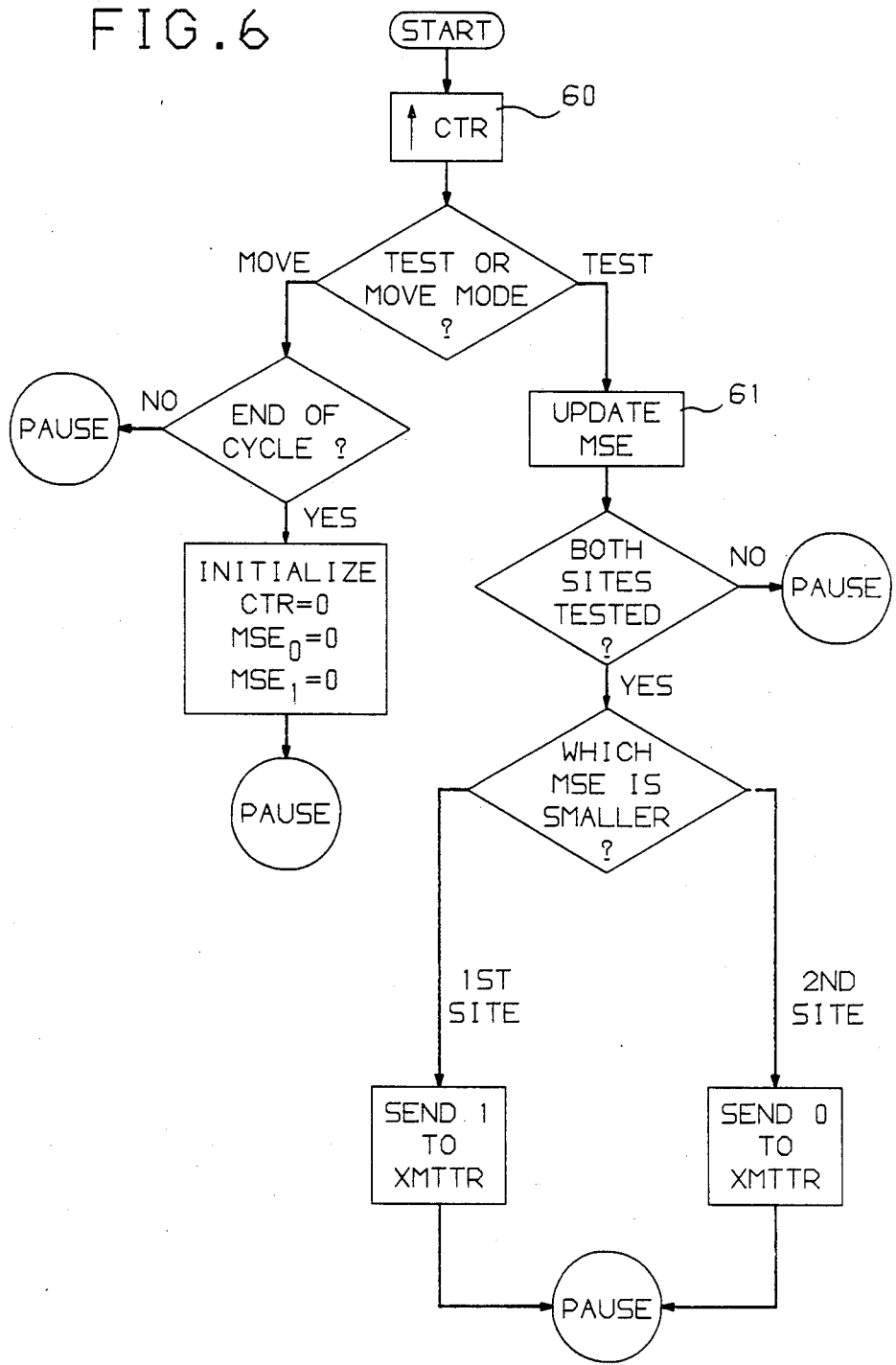

TECHNIQUE FOR REPELLING CARRIERS IN OPTICAL COMMUNICATIONS TO MINIMIZE MUTUAL INTERFERENCE

TECHNICAL FIELD

The present invention relates to a technique for facilitating the frequency division multiplexing (FDM) of carriers in optical communication systems to minimize mutual interference.

DESCRIPTION OF THE PRIOR ART

An aim in communication systems is to devise practical ways of support large numbers of high-speed users on a single hierarchical optical unit. One technique used is Time Division Multiplexing (TDM) as discussed, for example, in the article Wide Band Optical Communication Systems Part I -Time Division Multiplexing by T. S. Kinsel in *Proceedings of the IEEE,* Vol. 58, No. 10 October 1970 at pages 1666–1682. An alternative technique is Frequency Division Multiplexing (FDM) as disclosed, for example, in U.S. Pat. No. 4,232,385 issued to E. H. Hara et al. on Nov. 4, 1980, and U.S. Pat. No. 4,601,027 issued to R. W. A. Scarr et al. on July 5, 1986.

In optical FDMA systems, performance is impaired by laser phase noise which causes modulated optical carriers, nominally separated in frequency, to not be truly spectrally disjoint. More particularly, in local optical communication systems employing coherent optics, phase noise is often a dominant impairment. This communication impairment is worsened by the difficulty in reliably situating carriers. The problem remaining int he prior art is to provide a simple technique for implementing equally, or maximally, spaced carriers in an FDM optical communication system to maximize the reduction of interference from adjacent optical channels.

SUMMARY OF THE INVENTION

The foregoing problem in the prior art has been solved in accordance with the present invention which relates to a technique for repelling, or equally spacing, carriers in a Frequency Divison Multiplexing (FDM) lightwave communication system. More particularly, with the present technique optical carriers are made to appear to repel each other somewhat in the manner of like charges confined to a linear track. In operation, while sending information, a transmitter section at a local transceiver randomly dithers the optical frequency transmission slowly (compared to the bit rate). In random order, a receiver section as a desired remote transceiver obtains samples over a large number of symbols at a first and then a second nearby frequency which are slightly to the left and to the right, respectively, of the current nominal frequency of transmission. The receiver section then estimates the amount of interference present during the course of each of the two sampling periods at the first and second nearby frequencies, and then relays that information back to the local transmitter. The local transmitter slowly moves in the direction where the interference is lower, as indicated by the feedback signal from the remote receive section. This process is repeated continuously to effect and maintain maximally spaced carriers over the frequency spectrum of the communication system and thereby provide minimum interference from adjacent FDM channels.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views:

FIG. 5 is a diagram showing the composition of one cycle in the dithering sequence in accordance with the present invention; and FIG. 6 is a flow diagram of the receiver microprocessor logic for the dithering sequence shown in FIG. 5.

DETAILED DESCRIPTION

Figure 2:
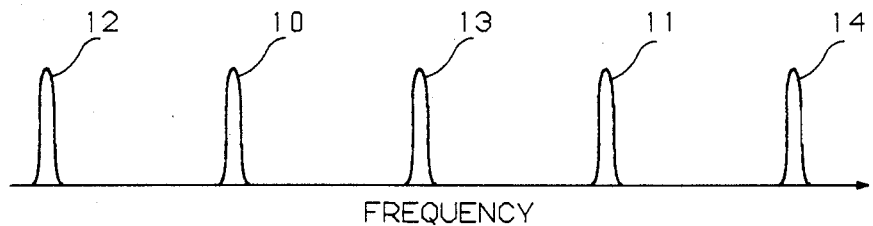
FIG. 2 is a frequency spectral diagram showing equally spaced carriers produced in accordance wtih the present invention.

To support large numbers, e.g., tens of thousands, of simultaneous high speed users over a lightwave network, a Frequency Divison Multiplexing (FDM) technique can be used where each channel transmits with a different optical carrier. However, such (FDM) technique has a key impairment of laser phase noise. In accordance with the Lorentzian phase noise model, for each channel, the power of the interfering signal from each of the other channels varies directly as the bandwidth of the phase noise and inversely as the square of carrier separation. Therefore, equally spaced carriers as shown in FIG. 2 would be an ideal technique to employ. It has, however, been difficult to find a simple method for implementing, and especially maintaining, such ideal condition of equally spaced carriers. If the modulated carriers could be equally spaced in the FDM technique, then, in a properly sized system, the Carrier-to Noise ratio (CNR) would stay above a desired performance threshold to provide minimal interference.

Figure 3:
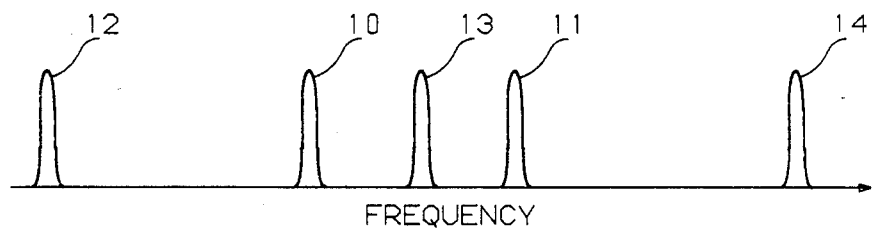
FIG. 3 is am exemplary frequency spectral diagram showing unequally spaced carriers as may be found t the receivers of a system of FIG. 1 not practicing the present invention.

In FDM lightwave networks, laser drift is experienced which causes carriers to stray from their nominal spectral positions, as shown in FIG. 2, to the positions shown, for example, in FIG. 3 for the carriers designated 10 and 11. The present invention provides a technique for repelling carriers in an FDM lightwave system to achieve and maintain equally spaced carriers as shown in FIG. 2. In accordance with the present technique, each transmitter of the system slowly dithers the FDM signals of its transmitted channel, while each receiver monitors and measures the interference level due to the channels on either side of the channel it desires to receive, and feeds back that information to the transmitter originally sending the desired signal. That transmitter will then use the information to move the frequency of its lightwave carrier in such a way as to minimize that interference. The repelling carrier technique is useful in mitigating adjacent channel interference even when phase noise is negligible. The inverse square law character of the spectral tails are not essential. All that is needed is a (approximately) decreasing spectrum outside the nominal band.

Figure 1:
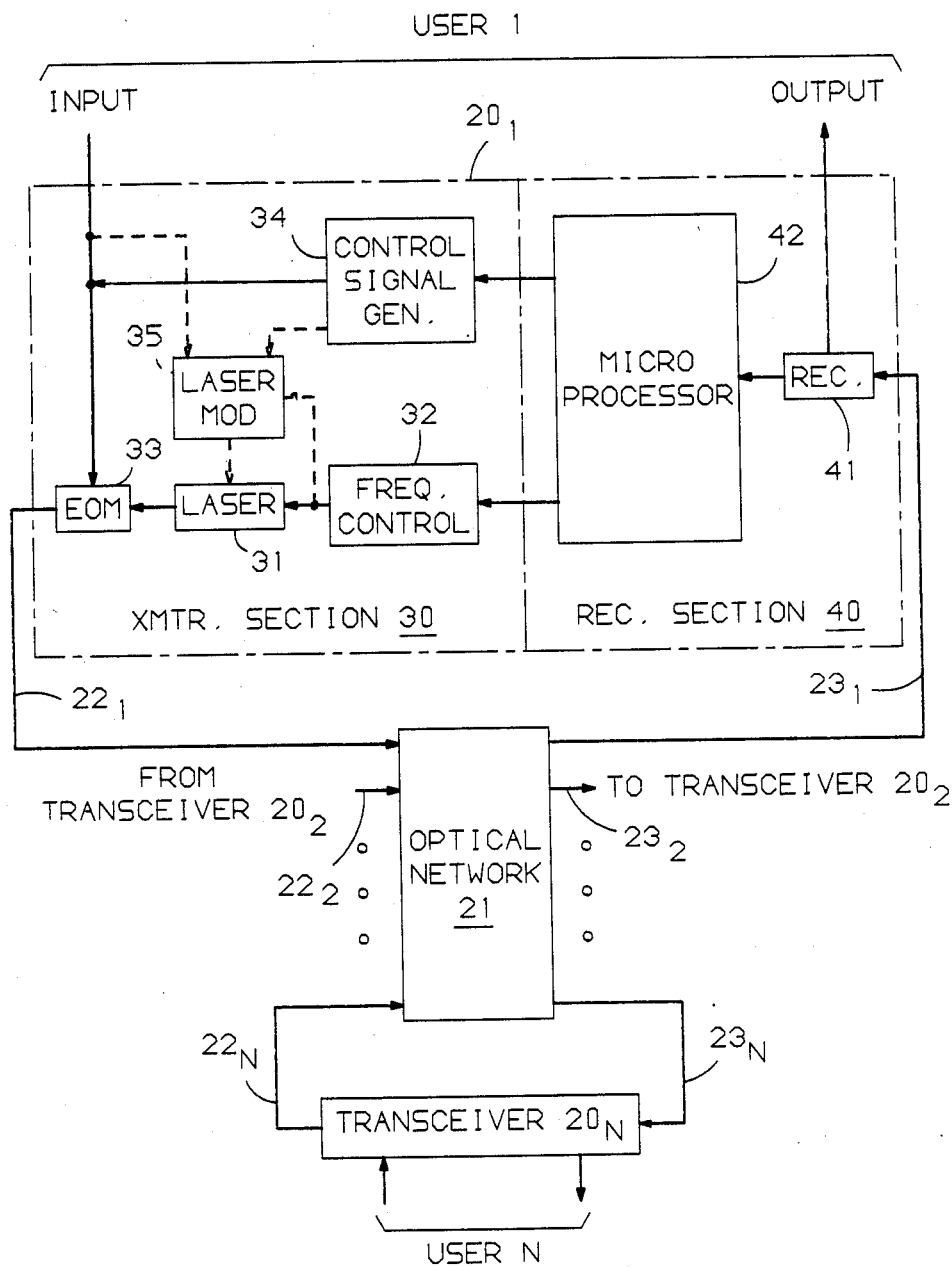
FIG. 1 is a block diagram of a typical optical communication system for practicing the present invention.

FIG. 1 shows a block diagram of an exemplary lightwave system for practicing the present invention, which includes a plurality of N transceivers $20_1$ to $20_N$, and an optical network 21 which interconnects the N transceivers. For purposes of explanation, optical network 21 can comprise any optical Local Area Network configuration, such as a linear bus, a loop, a star, etc., but the preferred network is the Star configuration as shown in FIG. 1 In FIG. 1, transceiver $20_1$ is shown in an exemplary block diagram, which corresponds to the exemplary configuration found in the other transceivers $20_2$ to $20_N$ of the system.

Each transceiver $20_i$ comprises a transmitter section 30 and a receiver section 40. An exemplary transmitter section 30 is shown as including a laser 31 for generating a desired carrier for use in transmitting information signals from transmitter section 30; a frequency control arrangement 32 for both providing a proper bias to tune the laser and for slowing dithering the carrier frequency (wavelength) generated by laser 31; an electro-optic modulator 33 for modulating the carrier signal from laser 31 with an information signal received from a user which is associated with the transceiver; and a control signal generator arrangement 34 for generating a feedback control signal for transmission back to a remote receiver with the information signal. An exemplary receiver section 40 is shown as including a receiver 41 for receiving the information signals from the optical network and appropriately prcoessing the received information signals for transmission at a desired channel signal to the desired end user and to a microprocessor 42 as will be explained in greater detail hereinafter.

Figure 4:
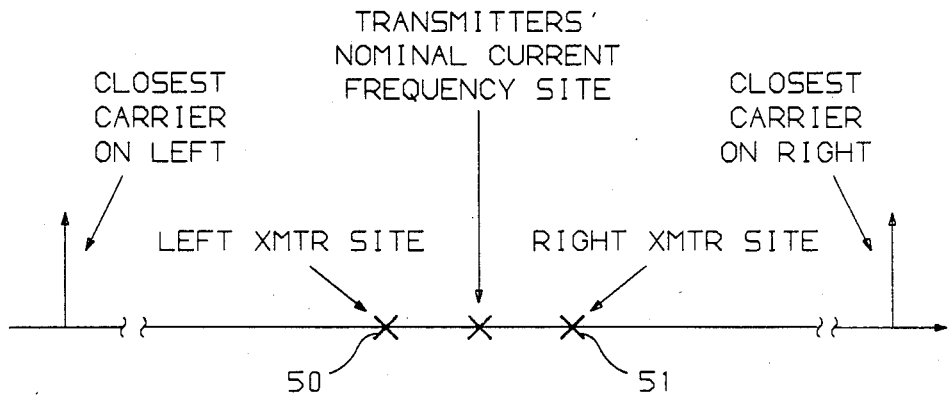
FIG. 4 is a frequency spectral diagram showing key frequencies for the dithering process in accordance with the present invention.

To describe the operation of the present invention using FIG. 1, it will be assumed that the user of transceiver $20_1$ wishes to communciate with the user of transceiver $20_N$ via optical network 21 using the carrier 10 shown in FIG. 2. For purposes of explanation, it will also be assumed that the user of transceiver $20_N$ will use the carrier 11 shown in FIG. 2 to provide the two-way communication with the user of transceiver $20_1$. At transceiver $20_1$, laser 31 is tuned to generate carrier 10 at its output by frequency control arrangement 32. At transceiver $20_N$, laser 31 is tuned to generate carrier 11 at its output by the associated frequency control arrangement 32. Unknown to any receiver section 40, each of frequency control arrangements 32 in transceivers $20_1$ and $20_N$ also slowly dithers the frequency of carrier 10 and 11, respectively, first to a nearby frequency 50 slightly to the left and then to a second nearby frequency 51 slightly to the right of the current nominal frequency of respective carriers 10 and 11, as shown in FIG. 4. In transceiver $20_1$, the slowly dithering carrier 10 from laser 31 is modulated (as, for example, through electro-optic modulator (EOM) 33) with the information signal received from associated user 1. The slowly dithering modulated output signal from transmitter section 30 of transceiver $20_1$ is transmitted via lightguide $22_1$ to optical network 21 (where it is distributed to all receiver sections 40), and then via lightguide $23_N$ to the receiver section 40 of transceiver $20_N$.

As described above, the carrier frequency at any transmitter section 30 is dithered (a) in random order and is, therefore, not synchronized to any receiver section, and (b) slowly enough relative to the high symbol rate of the transmitted user's information signal to permit normal tracking of the dithered carrier by a receiver section 40. The receiver 41, in receiver section 40 of transceiver $20_N$, converts the received lightwave signal into a corresponding electrical signal for transmission to user N, while easily tracking the slowing dithering received signal from transceiver $20_1$ using, for example, a known frequency tracking loop. Receiver 41 also samples the received information signal before transmission to user N and measures the amplitude of each sample to permit estimates of the mean square error (MSE) of the received signal samples to be determined in an associated microprocessor 42. The MSE estimate computed for each of the left and right sites 50 and 51 serves as an indicator of the level of background interference for each site.

More particularly, receiver 41 section 40 of transceiver $20_N$ measures the amplitude of each received sample, and provides such level indication to a microprocessor 42 associated with receiver 41. Microprocessor 42 stores each of the amplitude indication from receiver 41, and computes therefrom the MSE estimates during the dithering of the received signal to both of the nearby frequencies 50 and 51 shown in FIG. 4. The MSE estimates are computed by taking the measured error amplitudes provided tby receiver 41 for each of sites 50 and 51, squaring these level values, and then summing the squared values over a time interval or predetermined length, to provide the MSE estimate for each of sites 50 and 51. Microprocessor 42 then conveys a control signal representative of such MSE estimate to control signal generator 34 of transceiver $20_N$. At the appropriate time, control signal generator 34 adds the control signal from microprocessor 42 into, for example, the preamble of a next information signal segment being sent to EOM 33 to complete a two-way communication to transceiver $20_1$. The return information and control signal is transmitted on carrier 11 via lightguide $22_N$, optical network 21 and lightguide $23_1$ to receiver 41 in transceiver $20_1$. From the received information about the MSE estimates, microprocessor 42 of transceiver $20_1$, determines which frequency site, 50 or 51, is preferred, because such site provided the least estimated MSE. Alternatively, a more refined repulsion mechanism can be implemented by using the estimated MSE gradient to calculate the frequency correction.

Receiver 41 and microprocessor 42 of transceiver $20_1$ function as described above for the correpsonding circuits of transceiver $20_N$, and convey a control signal indicating the preferred frequency 50 or 51 to frequency control arrangement 32. If laser 31 is not already at the preferred frequency site 50 or 51, frequency control arrangement 32 of transceiver $20_1$ slowly moves carrier 10 generated by laser 31 to the preferred site. From the movement to the preferred site, the cycle begins anew and FIG. 5 shows the sequencing of the test and frequency movement modes in each cycle at each transceiver $20_1$ from the slowly dithered carrier 11 from transceiver $20_N$, are similarly used to determine the preferred frequency site 50 ro 51 associated with carrier 11, which preferred site is transmitted via control signal generator 34 and EOM 33 of transceiver $20_1$ back to transceiver $20_N$, so it can similarly move its carrier 11 to the preferred site. The above-described sequency continues during the time of the two-way communication between the two transceivers.

From the above explanation, it can be seen that if the carriers 10 and 11 drifted to the positions shown in FIG. 3, the preferred site for carrier 10 would be towards the left, in the direction of carrier 12, since there would be less interference from a signal associated with the more distant carrier 12 than from a signal associated with carrier 13. Therefore, carrier 10 would slowly be moved to the position shown in FIG. 2 which is approximately equidistant between carriers 12 and 13. Similarly, carrier 11 would be moved to the right since, as shown in FIG. 3, the MSE estimates associated with the signal of carrier 11 would show more interference from the signal associated with carrier 13, than from a signal associated with carrier 14. Therefore, carrier 11 would slowly be moved right until it reached the position shown in FIG. 2 which is approximately equidistant between carriers 13 and 14.

The fact that adjacent carreirs are also dithering their frequency may cause the algorithm to make a mistake when deciding the frequency correction required to decrease the interference level. However, it is easy to see how an approximately chosen dithering pattern can obviate this problem. For example, a simple random pattern for choosing which site to sample next is sufficient to insure that, in the long run, the averaged frequency correction will be in the right direction.

There may be an advantage to always transmitting, even if the transmitter is not communicating with another transceiver or seeking to begin a communication, since then repulsion is maintained. Consequently, there is a loose association between a transceiver and its spectral location, thereby providing an opportunity for speeding the call start-up process. A transceiver that is not currently involved in a call might spend a fraction of its time monitoring its own test sequence to repel itself from other carriers. That transceiver would periodically alternate between monitoring its own transmission for repulsion and seeing if a channel to it is to be established.

Under the conditions mentioned hereinabove, there is always a floating of the entire system of carriers, and there is a remote possibility that a specific transceiver could have, for whatever reason, moved to a new relative position. For example, a channel may have failed and they been re-established, or new channels may have been added to the system. Nonetheless, there is a very strong correlation between a transceiver's location and the dial setting (the current value for frequency control) used by the receiver in the previous call involving that transceiver. So the opportunity is there for transceivers to utilize the present technique which capitalizes on this correlation to reduce start up time. Scanning for calls can be done by scanning bands in priority order by any suitable technique known in the art. The prioritization can favor most frequent or most important callers in the community of interest.

It is to be understood that control is decentralized. Although the prior paragraphs describe a loose ordering of channels, there is no catastrophe if the order changes occasionally. Moreover, it is not required that each transceiver avail itself of the opportunity for reducing start-up time. Another advantage of requiring each transceiver to maintain a spectral presence is that the problem of clashing of call originations is avoided. The powering required for permanent transmission would seem to be minimal and it is hard to envisage circumstances where the bandwidth resource is not abundant enough to "waste" a bandwidth allocation on an idle channel.

The logic for microprocessor 42 for implementing the present technique is not complex. An exemplary sequence for the microprocessor 42 logic is shown in FIG. 6. The counter 60 is used to discern the onset of each of the four modes indicated in FIG. 5. Aside from counter 60, the only other additional memory that is required in microprocessor 42 is for registers (not shown but referred to by block 61) for the two MSE estimates associated with sites 50 and 51.

It is to be understood that the above is a description of a preferred embodiment and is not for purposes of limitation, and that other and further modifications could be made which will fall within the spirit and scope of the present invention. Fof example, as shown in FIG. 1, in transmitter section 30 a laser modulator 35 could be used to combine the input signal from the user with the signals from frequency control arrangement 32 and control signal generator 34 to directly modulate laser 31 for transmission via associated lightguide $22_i$. Under such condition EOM 33 would not be required. As stated hereinbefore, other system arrangements could also be used other than the Star configuration described.

What is claimed is:

1. A transceiver for use in a frequency division multiplexing (FDM) lightwave communication system, the transceiver comprising:
   a transmitter section (30) including;
   means (31) for generating a predetermined nominal lightwave carrier signal;
   means (33–35) for modulating the nominal lightwave carrier signal from the generating means with an information signal to be transmitted from the transmitter section to a remote transceiver; and
   means (32) for generating control signals to the generating means for causing said generating means to slowly dither the nominal lightwave carrier signal to a first carrier frequency on a first side of the nominal carrier signal and then to a second carrier frequency on a second side of the nominal carrier signal opposite the first side thereof in a manner that enables a collective background interference to be sensed for each of the first and second sides of the nominal carrier frequency by the remote transceiver for deriving a control signal for transmission back to the generating means to reposition the carrier and situate the carrier more favorably amid the background interference.

2. A transceiver according to claim 1 wherein the transceiver further comprises:
   a receiver section comprising;
   a receiver, responsible to a lightwave information signal transmited by the remote transceiver which modulated a second nominal lightwave carrier signal with an information signal destined for the receiver section while slowly dithering the second lightwave carrier signal to a first carrier frequency on a first side of the second nominal carrier signal and then to a second carrier frequency on a second side of the second nominal carrier signal opposite the first side thereof, for (a) demodulating the received lightwave information signal for transmission to an associated user of the system and (b) operating on the demodulated information signal for generating an output signal to the generating means of the transmitter section from which corrective movement of the carrier signal can be effected to situate the first nominal carrier signal more favorably amid the background interference, and
   a processor responsive to the output signal from the receiver for determining an indicator of a collective background interference level for each of the first and second sides of the second nominal carrier signal and for generating a control signal to effect corrective movement of the second nominal carrier signal at the remote transceiver to a frequency with a lower background interference level for transmission to the modulating means of the transmitter section for transmission back to the remote transceiver in the modulated information signal.

3. A method of transmitting signals in a frequency division multiplexed (FDM) lightwave communication system, the method comprising the steps of:

at a first transceiver associated with a first user of the system (a) generating a nominal carrier lightwave signal;
(b) modulating the nominal carrier lightwave signal with an information signal received from the first user;
(c) slowly dithering the nominal carrier lightwave signal generated in step (a) to a first carrier frequency on a first side of the nominal carrier lightwave signal and then to a second carrier frequency on a second opposite side of the nominal carrier lighwave signal of the first user; and
(d) transmitting the modulated information signal generated in step (c) onto a lightwave communication medium for transmission to a remote transceiver; and at a remote transceiver associated with a second user, (e) demodulating the modulated information signal received from the first transceiver for transmission to the second user, and sequentially sampling the demodulated information signal so as to generate control signals indicating a collective background interference level for each of the first and second sides of the dithered nominal carrier lightwave signal for promoting favorable repositioning of the carrier at the first transceiver; and
(f) transmitting a carrier control signal back to the first transceiver for moving the nominal carrier frequency generated in step (a) to a carrier frequency with a lower background interference level which is derivable from the carrier control signal before reiterating steps (b) to (f) during the next cycle period.

* * * * *